(12) United States Patent
Kim et al.

(10) Patent No.: US 10,262,214 B1
(45) Date of Patent: *Apr. 16, 2019

(54) LEARNING METHOD, LEARNING DEVICE FOR DETECTING LANE BY USING CNN AND TESTING METHOD, TESTING DEVICE USING THE SAME

(71) Applicant: Stradvision, Inc., Pohang (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/121,670

(22) Filed: Sep. 5, 2018

(51) Int. Cl.
*G06K 9/00* (2006.01)
*G06K 9/62* (2006.01)
*G06N 3/08* (2006.01)
*G06T 7/77* (2017.01)

(52) U.S. Cl.
CPC ....... *G06K 9/00798* (2013.01); *G06K 9/6262* (2013.01); *G06K 9/6269* (2013.01); *G06N 3/084* (2013.01); *G06T 7/77* (2017.01)

(58) Field of Classification Search
CPC .. G06N 3/08; G06N 3/02; G06K 9/66; G06K 9/6256; G06K 9/4604; G06K 9/00288; G06K 9/00744; G06K 9/46; G06K 9/6267; G06T 2207/20081; G06T 3/4046; G06T 2207/20084

See application file for complete search history.

(56) References Cited

PUBLICATIONS

Huval, Brody, et al. "An empirical evaluation of deep learning on highway driving." arXiv preprint arXiv:1504.01716 (2015). (Year: 2015).*

(Continued)

*Primary Examiner* — Vincent Rudolph
*Assistant Examiner* — Raphael Schwartz
(74) *Attorney, Agent, or Firm* — Xsensus LLP

(57) ABSTRACT

A learning method of a CNN for detecting lanes is provided. The method includes steps of: a learning device (a) instructing convolutional layers to generate feature maps by applying convolution operations to an input image from an image data set; (b) instructing an FC layer to generate an estimated result vector of cluster ID classifications of the lanes by feeding a specific feature map among the feature maps into the FC layer; and (c) instructing a loss layer to generate a classification loss by referring to the estimated result vector and a cluster ID GT vector, and backpropagate the classification loss, to optimize device parameters of the CNN; wherein the cluster ID GT vector is GT information on probabilities of being cluster IDs per each of cluster groups assigned to function parameters of a lane modeling function by clustering the function parameters based on information on the lanes.

20 Claims, 11 Drawing Sheets

(56) References Cited

PUBLICATIONS

Neven, Davy, et al. "Towards End-to-End Lane Detection: an Instance Segmentation Approach." arXiv preprint arXiv:1802.05591 (Feb. 15, 2018). (Year: 2018).*

Bailo, Oleksandr, et al. "Robust road marking detection and recognition using density-based grouping and machine learning techniques." Applications of Computer Vision (WACV), 2017 IEEE Winter Conference on. IEEE, 2017. (Year: 2017).*

* cited by examiner

US 10,262,214 B1

LEARNING METHOD, LEARNING DEVICE FOR DETECTING LANE BY USING CNN AND TESTING METHOD, TESTING DEVICE USING THE SAME

FIELD OF THE INVENTION

The present invention relates to a learning method for detecting one or more lanes by using a CNN; and more particularly, to the learning method for detecting one or more lanes by using a CNN, including steps of: (a) instructing one or more convolutional layers to generate one or more feature maps by applying one or more convolution operations to an input image selected from at least one image data set; (b) instructing an FC layer to generate an estimated result vector of cluster ID classifications of the lanes in the input image by feeding a specific feature map among the feature maps outputted from the convolutional layers into the FC layer; and (c) instructing a loss layer to generate at least one classification loss by referring to the estimated result vector of the cluster ID classifications and a cluster ID GT vector, and backpropagate the classification loss, to thereby optimize device parameters of the CNN; wherein the cluster ID GT vector is GT information on probabilities of being cluster IDs per each of cluster groups assigned to function parameters of a lane modeling function by clustering the function parameters acquired based on information on the lanes in the input image, and the learning device, the testing method, and the testing device using the same

BACKGROUND OF THE INVENTION

Deep learning is a technology used to cluster or classify objects or data. For example, computers cannot distinguish dogs and cats from photographs alone. But a human can easily distinguish those two. To this end, a method called "machine learning" was devised. It is a technique to allow a computer to classify similar things among lots of data inputted into the computer. When a photo of an animal similar to a dog is inputted, the computer will classify it as a dog photo.

There have already been many machine learning algorithms to classify data. For example, a decision tree, a Bayesian network, a support vector machine (SVM), an artificial neural network, etc. have been developed. The deep learning is a descendant of the artificial neural network.

Deep Convolution Neural Networks (Deep CNNs) are the heart of the remarkable development in deep learning. CNNs have already been used in the 90's to solve the problem of character recognition, but their use has become as widespread as it is now thanks to recent research. These deep CNNs won the 2012 ImageNet image classification tournament, crushing other competitors. Then, the convolution neural network became a very useful tool in the field of the machine learning.

FIG. 1 shows an example of various outputs to be acquired from a photograph using a deep CNN according to prior art.

Classification is a method for identifying a type of a class to be acquired from a photograph, for example, as shown in FIG. 1, determining whether an acquired object is a person, a lamb, or a dog. Detection is a method for finding every object and displaying the found object as enclosed in a bounding box. Segmentation is a method for distinguishing a region of a specific object from other objects in a photograph. As the deep learning has recently become popular, the classification, the detection, and the segmentation are using the deep learning heavily.

FIG. 2 is a simplified drawing of a conventional lane detection method using a CNN, and FIG. 3 is a simplified drawing of a general CNN segmentation process.

First of all, by referring to FIG. 3, according to the conventional lane detection method, a learning device receives an input image, acquires feature maps by multiple convolution operations and non-linear operations like ReLU in multiple convolutional layers, and acquires a segmentation result by performing multiple deconvolution operations in multiple deconvolutional layers and SoftMax operations on a last of the feature maps.

Also, by referring to FIG. 2, the segmentation result of the conventional lane detection method is composed of two elements, i.e., lanes and backgrounds, as shown in the middle of FIG. 2. The segmentation result is expressed as probability estimation. The lanes are found by sampling pixels with high probabilities of being on any lane from candidate pixels on the lane selected as such, and then the lanes are finally determined by using a lane modeling function acquired from pixels on the found lanes.

However, such the conventional lane detection method has a problem in that it requires a large amount of calculation because every pixel in the input image must be checked to determine whether each of the pixels belongs to the lane or not.

SUMMARY OF THE INVENTION

It is an object of the present invention to solve all the aforementioned problems.

It is another object of the present invention to provide a method which requires less computation than a conventional method when detecting lanes.

It is still another object of the present invention to provide a method for learning a CNN that can learn a lane model.

It is still yet another object of the present invention to provide a method for accurately detecting the lane using the lane model.

In accordance with one aspect of the present invention, there is provided a learning method for detecting one or more lanes by using a CNN, including steps of: (a) a learning device instructing one or more convolutional layers to generate one or more feature maps by applying one or more convolution operations to an input image selected from at least one image data set; (b) the learning device instructing an FC layer to generate an estimated result vector of cluster ID classifications of the lanes in the input image by feeding a specific feature map among the feature maps outputted from the convolutional layers into the FC layer; and (c) the learning device instructing a loss layer to generate at least one classification loss by referring to the estimated result vector of the cluster ID classifications and a cluster ID GT vector, and backpropagate the classification loss, to thereby optimize device parameters of the CNN; wherein the cluster ID GT vector is GT information on probabilities of being cluster IDs per each of cluster groups assigned to function parameters of a lane modeling function by clustering the function parameters acquired based on information on the lanes in the input image.

As one example, the cluster ID GT vector is a K+1 dimensional vector, and (i) on condition that the lanes are determined as present in the input image, if there is a specific lane, having a specific cluster ID $C_k$ among the K cluster IDs, among the lanes in the input image, then a k-th dimension of the cluster ID GT vector is filled with 1, other dimensions of the cluster ID GT vector which respectively correspond to other cluster IDs, among the cluster IDs, not in the input image are filled with 0, and a (K+1)-th dimension of the cluster ID GT vector is filled with 0, and (ii) if no lanes are determined as present in the input image, a first dimension to a K-th dimension of the cluster ID GT vector are filled with 0, and the (K+1)-th dimension of the cluster ID GT vector is filled with 1, wherein k is an integer ranging from 1 to K, and wherein, at the step of (c), the estimated result vector of the cluster ID classifications is a K+1 dimensional vector.

As one example, on condition that each of the lanes $L_{i,j}$ is included in its corresponding cluster group $C_k$ of the cluster groups, and that k is each cluster ID among the cluster IDs corresponding to said each of the lanes $L_{i,j}$, each of the cluster groups has each of averaged values $$\theta_k = \frac{1}{|C_k|} \sum_{L_{i,j} \in C_k} \theta_{i,j}$$

over the function parameters of the respective lanes included in the respective cluster groups, as each of representative cluster group values $\theta_k$, and wherein the method further includes a step of: (d) the learning device generating or supporting another device to generate each of the representative cluster group values corresponding to each of the estimated cluster IDs, and determining or supporting another device to determine each of the estimated lanes represented by each of the representative cluster group values $\theta_k$.

As one example, each of the representative cluster group values is acquired by using at least part of the estimated cluster IDs, wherein the at least part of the estimated cluster IDs are determined by referring to information on whether each of vector components of the result vector is larger than a predetermined value.

As one example, the method further includes steps of: (e) the learning device generating or supporting another device to generate at least one existence loss which represents whether one of GT lanes is present near each of the estimated lanes, based on whether coordinates of said one of the GT lanes is present within a certain number of pixels in either direction parallel to an x-axis from respective coordinates of each of the estimated lanes; (f) the learning device, if said one of the GT lanes is determined as present near each of the estimated lanes, generating or supporting another device to generate at least one distance regression loss by referring to each of distances $x^{GT}-f(y|\theta_k)$ between each of pixels $(f(y|\theta_k),y)$ of each of the estimated lanes and each of pixels $(x^{GT}, y)$ of each corresponding one among the GT lanes; and (g) the learning device backpropagating or supporting another device to backpropagate the existence loss and the distance regression loss, to thereby optimize the device parameters of the CNN.

As one example, before the step of (e), the method further includes a step of: (e0) the learning device extracting or supporting another device to extract each of one or more areal features which represents each of areas near the pixels $(f(y|\theta_k),y)$ of each of the estimated lanes from the specific feature map; wherein the existence loss and the distance regression loss are generated based on the areal features.

As one example, at the step of (e), the existence loss is generated by using a cross entropy, and wherein, at the step of (f), the distance regression loss is generated by using at least one Euclidean distance regression loss.

In accordance with another aspect of the present invention, there is provided a testing method of a CNN capable of detecting one or more lanes using a lane model, including steps of: (a) on condition that a learning device has (i) instructed one or more convolutional layers to generate one or more feature maps for training by applying one or more convolution operations to an input image for training selected from at least one image data set for training; (ii) instructed an FC layer to generate an estimated result vector of cluster ID classifications for training of the lanes in the input image for training by feeding a specific feature map for training among the feature maps for training outputted from the convolutional layers into the FC layer, and instructed a loss layer to generate at least one classification loss by referring to the estimated result vector of the cluster ID classifications for training and a cluster ID GT vector; (iii) generated each of representative cluster group values for training corresponding to each of estimated cluster IDs for training, and determined each of estimated lanes for training represented by each of the representative cluster group values $\theta_k$ for training; (iv) generated at least one existence loss which represents whether one of GT lanes is present near each of the estimated lanes for training, based on whether coordinates of said one of the GT lanes is present within a certain number of pixels in either direction parallel to an x-axis from respective coordinates of each of the estimated lanes for training; (v) generated at least one distance regression loss by referring to each of distances $x^{GT}-f(y|\theta_k)$ between each of pixels $(f(y|\theta_k),y)$ of each of the estimated lanes for training and each of pixels $(x^{GT}, y)$ of each corresponding one, determined as present near each of the estimated lanes for training, among the GT lanes; and (vi) backpropagated the classification loss, the existence loss and the distance regression loss, to thereby optimize the device parameters of the CNN, a testing device acquiring or supporting another device to acquire a test image; (b) the testing device generating or supporting another device to generate one or more feature maps for testing by applying the convolution operations to the test image; (c) the testing device instructing the FC layer to generate a result vector of cluster ID classifications for testing of the lanes in the test image by feeding a specific feature map for testing among the feature maps for testing into the FC layer wherein the result vector of cluster ID classifications for testing includes each of one or more cluster IDs for testing estimated for each of the lanes; and (d) the testing device generating each of representative cluster group values for testing corresponding to each of the estimated cluster IDs for testing, and determining each of estimated lanes for testing represented by each of the representative cluster group values $\theta_k$ for testing; wherein the cluster ID GT vector is GT information on probabilities of being the cluster IDs for training per each of cluster groups assigned to function parameters of a lane modeling function by clustering the function parameters acquired based on information on the lanes in the input image for training, and wherein, if each of the lanes $L_{i,j}$ is included in its corresponding group $C_k$ of the cluster groups, k ranging from 1 to K, and if k is each cluster ID among the cluster IDs for training corresponding to said each of the lanes $L_{i,j}$, each of the cluster groups has each of averaged values $$\theta_k = \frac{1}{|C_k|} \sum_{L_{i,j} \in C_k} \theta_{i,j}$$

over the function parameters of the respective lanes included in the respective cluster groups, as each of representative cluster group values $\theta_k$ for training.

As one example, the method further includes steps of: (e) the testing device extracting or supporting another device to extract each of one or more areal features which represents each of areas near the pixels $(f(y|\theta_k),y)$ of each of the estimated lanes for testing from the specific feature map for testing; (f) the testing device determining or supporting another device to determine whether one of actual lanes is present near each of the estimated lanes for testing, based on whether coordinates of said one of the actual lanes are present within a certain number of pixels in either direction parallel to the x-axis from respective coordinates of said each of the estimated lanes for testing, and if said one of the actual lanes is determined as present nearby, calculating or supporting another device to calculate each of distances between coordinates of said one of the actual lanes and those of the estimated lanes for testing; and (g) the testing device determining or supporting another device to determine the estimated lanes for testing via translating the estimated lanes for testing by the amount of said each of the distances.

As one example, at the step of (d), each of the representative cluster group values for testing is acquired by using at least part of the estimated cluster IDs for testing, wherein the at least part of the estimated cluster IDs for testing are determined by referring to information on whether each of vector components of the result vector of the cluster ID classifications for testing is larger than a predetermined value.

In accordance with still another aspect of the present invention, there is provided a learning device for detecting one or more lanes by using a CNN, including: a communication part for acquiring or supporting another device to acquire an input image selected from at least one image data set; and a processor for performing processes of (i) instructing one or more convolutional layers to generate one or more feature maps by applying one or more convolution operations to the input image; (ii) instructing an FC layer to generate an estimated result vector of cluster ID classifications of the lanes in the input image by feeding a specific feature map among the feature maps outputted from the convolutional layers into the FC layer; and (iii) instructing a loss layer to generate at least one classification loss by referring to the estimated result vector of the cluster ID classifications and a cluster ID GT vector, and backpropagate the classification loss, to thereby optimize device parameters of the CNN; wherein the cluster ID GT vector is GT information on probabilities of being cluster IDs per each of cluster groups assigned to function parameters of a lane modeling function by clustering the function parameters acquired based on information on the lanes in the input image.

As one example, the cluster ID GT vector is a K+1 dimensional vector, and (I) on condition that the lanes are determined as present in the input image, if there is a specific lane, having a specific cluster ID Ck among the K cluster IDs, among the lanes in the input image, then a k-th dimension of the cluster ID GT vector is filled with 1, other dimensions of the cluster ID GT vector which respectively correspond to other cluster IDs, among the cluster IDs, not in the input image are filled with 0, and a (K+1)-th dimension of the cluster ID GT vector is filled with 0, and (II) if no lanes are determined as present in the input image, a first dimension to a K-th dimension of the cluster ID GT vector are filled with 0, and the (K+1)-th dimension of the cluster ID GT vector is filled with 1, wherein k is an integer ranging from 1 to K, and wherein, at the process of (iii), the estimated result vector of the cluster ID classifications is a K+1 dimensional vector.

As one example, on condition that each of the lanes Li,j is included in its corresponding cluster group Ck of the cluster groups, and that k is each cluster ID among the cluster IDs corresponding to said each of the lanes Li,j, each of the cluster groups has each of averaged values $$\theta_k = \frac{1}{|C_k|} \sum_{L_{i,j} \in C_k} \theta_{i,j}$$

over the function parameters of the respective lanes included in the respective cluster groups, as each of representative cluster group values $\theta_k$, and wherein the processor further performs a process of: (iv) generating or supporting another device to generate each of the representative cluster group values corresponding to each of the estimated cluster IDs, and determining or supporting another device to determine each of the estimated lanes represented by each of the representative cluster group values $\theta_k$.

As one example, each of the representative cluster group values is acquired by using at least part of the estimated cluster IDs, wherein the at least part of the estimated cluster IDs are determined by referring to information on whether each of vector components of the result vector is larger than a predetermined value.

As one example, the processor further performs processes of: (v) generating or supporting another device to generate at least one existence loss which represents whether one of GT lanes is present near each of the estimated lanes, based on whether coordinates of said one of the GT lanes is present within a certain number of pixels in either direction parallel to an x-axis from respective coordinates of each of the estimated lanes; (vi) if said one of the GT lanes is determined as present near each of the estimated lanes, generating or supporting another device to generate at least one distance regression loss by referring to each of distances $x^{GT}-f(y|\theta_k)$ between each of pixels $(f(y|\theta_k),y)$ of each of the estimated lanes and each of pixels $(x^{GT}, y)$ of each corresponding one among the GT lanes; and (vii) backpropagating or supporting another device to backpropagate the existence loss and the distance regression loss, to thereby optimize the device parameters of the CNN.

As one example, before the process of (v), the processor further performs a process of: (v0) extracting or supporting another device to extract each of one or more areal features which represents each of areas near the pixels $(f(y|\theta_k),y)$ of each of the estimated lanes from the specific feature map; wherein the existence loss and the distance regression loss are generated based on the areal features.

As one example, at the process of (v), the existence loss is generated by using a cross entropy, and wherein, at the process of (vi), the distance regression loss is generated by using at least one Euclidean distance regression loss.

In accordance with still yet another aspect of the present invention, there is provided a testing device of a CNN capable of detecting one or more lanes using a lane model, including: communication part, a communication part, (I) on condition that a learning device has (i) instructed one or more convolutional layers to generate one or more feature maps for training by applying one or more convolution operations to an input image for training selected from at least one image data set for training; (ii) instructed an FC layer to generate an estimated result vector of cluster ID classifications for training of the lanes in the input image for training by feeding a specific feature map for training among the feature maps for training outputted from the convolutional layers into the FC layer, and instructed a loss layer to generate at least one classification loss by referring to the estimated result vector of the cluster ID classifications for training and a cluster ID GT vector; (iii) generated each of representative cluster group values for training corresponding to each of estimated cluster IDs for training, and determined each of estimated lanes for training represented by each of the representative cluster group values $\theta_k$ for training; (iv) generated at least one existence loss which represents whether one of GT lanes is present near each of the estimated lanes for training, based on whether coordinates of said one of the GT lanes is present within a certain number of pixels in either direction parallel to an x-axis from respective coordinates of each of the estimated lanes for training; (v) generated at least one distance regression loss by referring to each of distances $x^{GT}-f(y|\theta_k)$ between each of pixels $(f(y|\theta_k),y)$ of each of the estimated lanes for training and each of pixels $(x^{GT}, y)$ of each corresponding one, determined as present near each of the estimated lanes for training, among the GT lanes; and (vi) backpropagated the classification loss, the existence loss and the distance regression loss, to thereby optimize the device parameters of the CNN, for acquiring or supporting another device to acquire a test image; and a processor for (II) generating or supporting another device to generate one or more feature maps for testing by applying the convolution operations to the test image; (III) instructing the FC layer to generate a result vector of cluster ID classifications for testing of the lanes in the test image by feeding a specific feature map for testing among the feature maps for testing into the FC layer wherein the result vector of cluster ID classifications for testing includes each of one or more cluster IDs for testing estimated for each of the lanes; and (IV) generating each of representative cluster group values for testing corresponding to each of the estimated cluster IDs for testing, and determining each of estimated lanes for testing represented by each of the representative cluster group values $\theta_k$ for testing; wherein the cluster ID GT vector is GT information on probabilities of being the cluster IDs for training per each of cluster groups assigned to function parameters of a lane modeling function by clustering the function parameters acquired based on information on the lanes in the input image for training, and wherein, if each of the lanes Li,j is included in its corresponding group Ck of the cluster groups, k ranging from 1 to K, and if k is each cluster ID among the cluster IDs for training corresponding to said each of the lanes Li,j, each of the cluster groups has each of averaged values $$\theta_k = \frac{1}{|C_k|} \sum_{L_{i,j} \in C_k} \theta_{i,j}$$

over the function parameters of the respective lanes included in the respective cluster groups, as each of representative cluster group values $\theta_k$ for training.

As one example, the processor further performs processes of: (V) extracting or supporting another device to extract each of one or more areal features which represents each of areas near the pixels $(f(y|\theta_k),y)$ of each of the estimated lanes for testing from the specific feature map for testing; (VI) determining or supporting another device to determine whether one of actual lanes is present near each of the estimated lanes for testing, based on whether coordinates of said one of the actual lanes are present within a certain number of pixels in either direction parallel to the x-axis from respective coordinates of said each of the estimated lanes for testing, and if said one of the actual lanes is determined as present nearby, calculating or supporting another device to calculate each of distances between coordinates of said one of the actual lanes and those of the estimated lanes for testing; and (VII) determining or supporting another device to determine the estimated lanes for testing via translating the estimated lanes for testing by the amount of said each of the distances.

As one example, at the process of (IV), each of the representative cluster group values for testing is acquired by using at least part of the estimated cluster IDs for testing, wherein the at least part of the estimated cluster IDs for testing are determined by referring to information on whether each of vector components of the result vector of the cluster ID classifications for testing is larger than a predetermined value.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
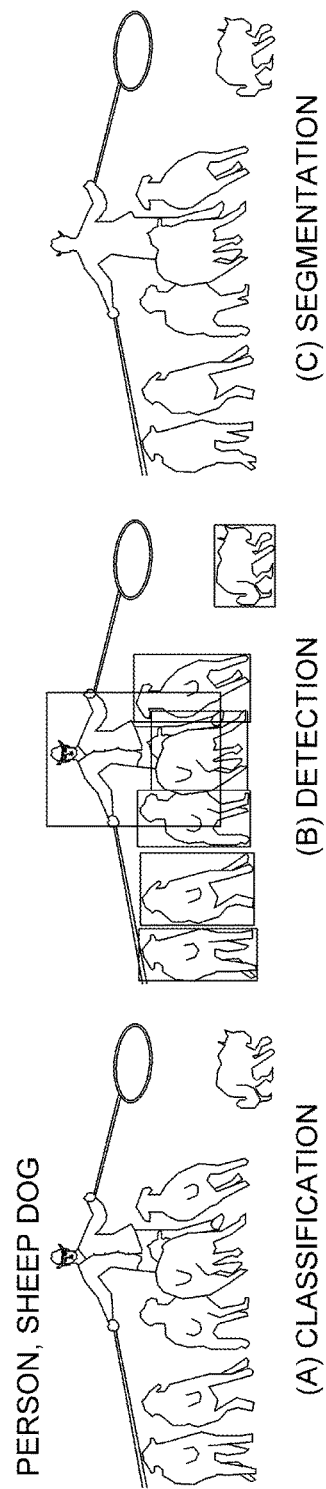
FIG. 1 is a drawing schematically illustrating an example of various outputs acquired from a photograph using a conventional CNN.
Figure 2:
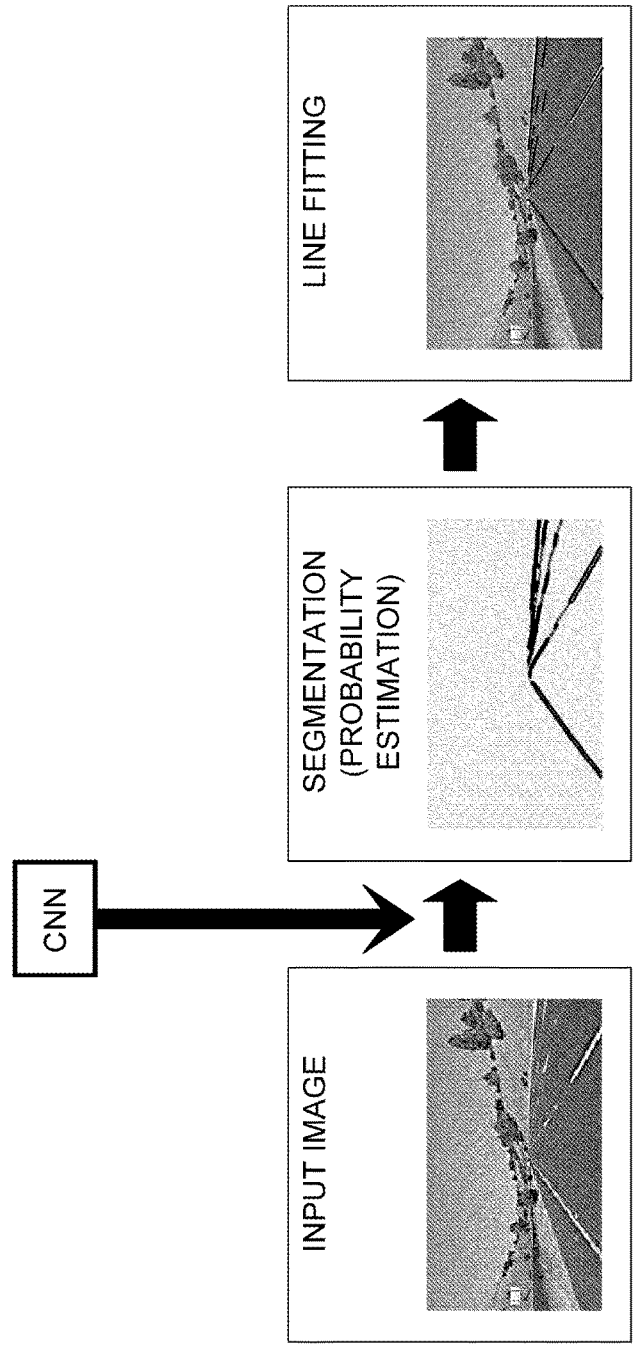
FIG. 2 is a drawing schematically illustrating a conventional lane detection method using the conventional CNN.
Figure 3:
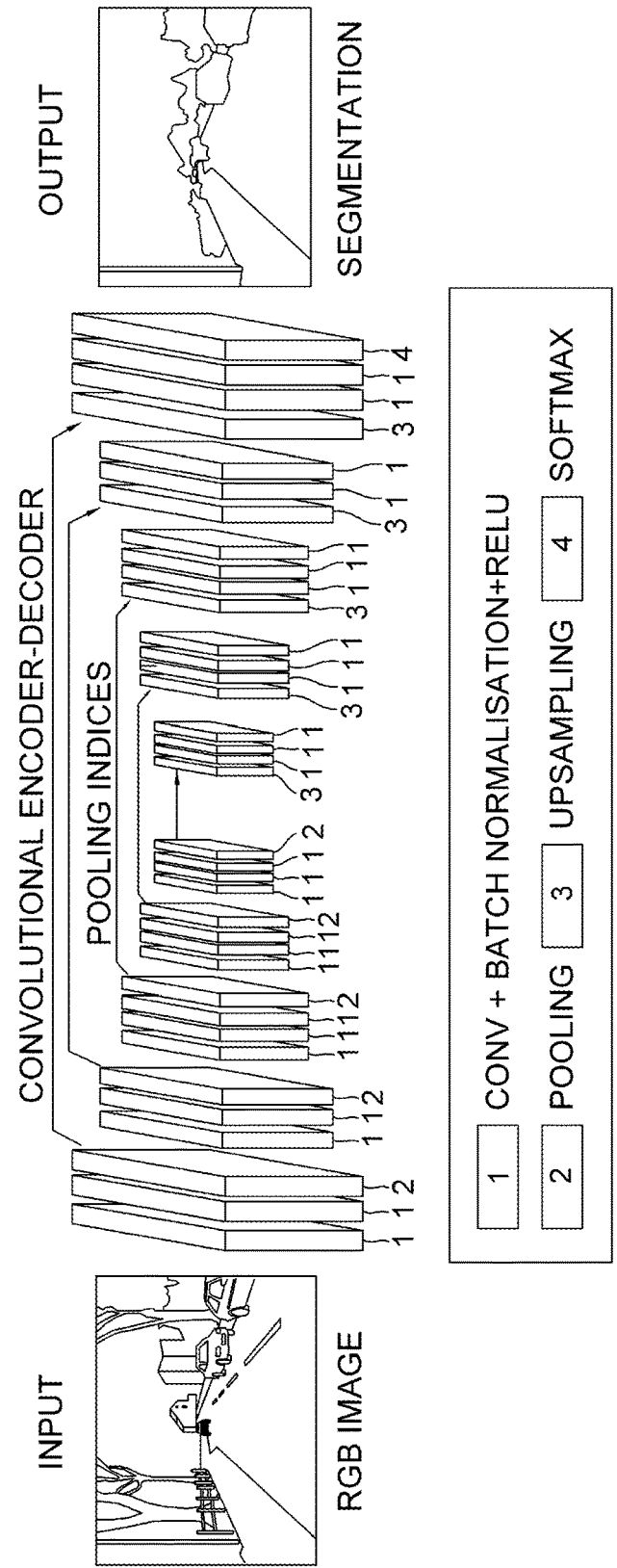
FIG. 3 is a drawing schematically illustrating a conventional process of a general segmentation by using a conventional CNN.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as shown below.

Figure 4:
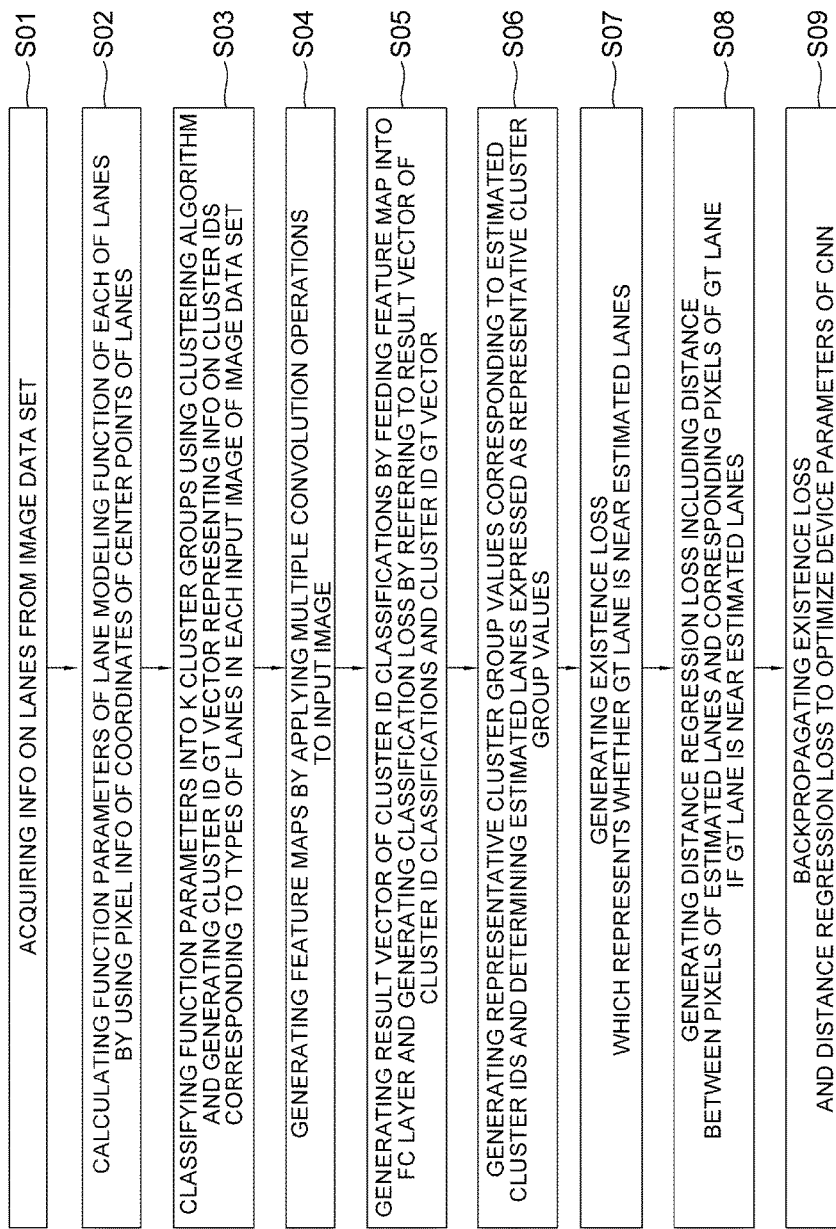
FIG. 4 is a drawing schematically illustrating a flow chart representing a learning method of a CNN capable of detecting a lane using a lane model in accordance with the present invention.

FIG. 4 is a drawing schematically illustrating a flow chart representing a learning method of a CNN (Convolutional Neural Network) capable of detecting one or more lanes using a lane model in accordance with the present invention.

By referring to FIG. 4, the learning method detecting the lanes through the lane model by using the CNN in accordance with the present invention may include a step S01 of acquiring information on lanes from at least one image data set, a step S02 of calculating function parameters of a lane modeling function of each of the lanes by using pixel information of coordinates of center points of the lanes, a step S03 of classifying the function parameters into K cluster groups by using a clustering algorithm, and generating a cluster ID GT (Ground Truth) vector representing information on one or more cluster IDs corresponding to types of the lanes in each input image of the at least one image data set, a step S04 of generating one or more feature maps by applying multiple convolution operations to the input image, a step S05 of generating a result vector of cluster ID classifications by feeding a specific feature map into an FC (Fully Connected) layer and generating at least one classification loss by referring to the result vector of the cluster ID classifications and the cluster ID GT vector, a step S06 of generating representative cluster group values corresponding to estimated cluster IDs, i.e., the result vector, and determining each of estimated lanes represented by the representative cluster group values $\theta_k$, a step S07 of generating at least one existence loss which represents whether one of GT lanes is present near the estimated lanes, a step S08 of generating at least one distance regression loss acquired by referring to a distance between pixels of the estimated lanes and corresponding pixels of said one of the GT lanes if said one of the GT lanes is determined as present near the estimated lanes, and a step S09 of backpropagating the classification loss, the existence loss and the distance regression loss, to thereby optimize device parameters of the CNN. However, every step from S01 to S09 of the present invention is not a requirement, that is, the present invention may be comprised only of the steps from S01 to S03 of generating the cluster ID GT vector, or may be comprised only of the steps from S04 to S09 of learning the device parameters on condition that the cluster ID GT vector has been acquired in any ways, e.g., without the steps from S01 to S03.

The learning method of the CNN capable of detecting the lanes using the lane model in accordance with the present invention may acquire from the at least one image data set (i) information on coordinates of the center points on the lanes and (ii) the cluster ID GT vector generated by clustering the function parameters of the lane modeling function calculated from the information on the coordinates of the center points. Then, the learning method in accordance with the present invention suggests a learning device that may estimate or support another device to estimate the lane modeling function using the input image, and find or support another device to find the center points on the lanes in the input image using the lane modeling function.

Figure 5:
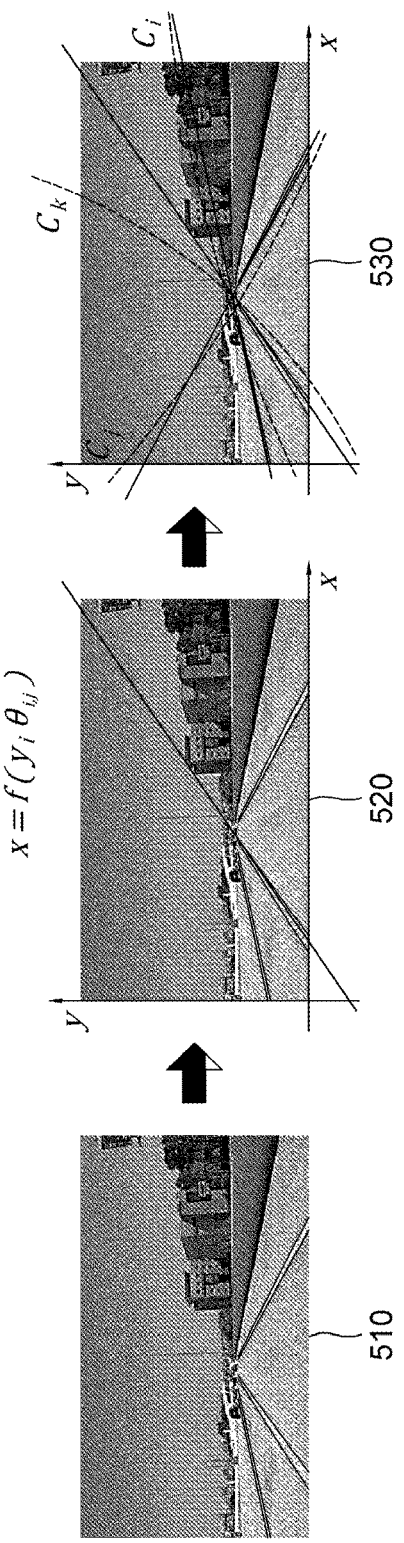
FIG. 5 is a drawing schematically illustrating a lane modeling function and cluster IDs from at least one image data set.

FIG. 5 is a drawing schematically illustrating a process of acquiring the lane modeling function and the cluster IDs from the at least one image data set.

By referring to FIG. 5, at the step of S01, the information on the lanes, represented by respective sets of coordinates of pixels on the lanes, may be acquired from the at least one image data set.

For example, pixel information on the lanes may be acquired from a specific input image 510 of the at least one image data set, and the information on the coordinates of the center points on the lanes may be acquired. Herein, the coordinates of the center points may be expressed as (x, y), and the lanes may be defined as a set of the coordinates of the center points. The lanes may be expressed as $L_{i,j}=\{(x, y)|(x, y)$ are the center points on a j-th lane in an i-th image$\}$.

Then, at the step of S02, the function parameters may be calculated by using the pixel information on the lanes, or the lane modeling function may be derived from the function parameters. The lane modeling function representing the coordinates of the center points (x, y) included in the lanes $L_{i,j}$ is expressed as below.

$$x=f(y;\theta_{i,j}) \qquad \text{<Formula 1>}$$

Herein, $L_{i,j}=\{(x, y)|(x, y)$ are the coordinates of the center points on the j-th lane in the i-th input image$\}=\{(x, y) x=f(y;\theta_{i,j})\}$ and $\theta_{i,j}$ may represent the j-th function parameter in the i-th input image.

The result of finding the function parameters $x=f(y;\theta_{i,j})$ by using the information on the lanes, i.e., the pixel information, in the specific input image 510 of FIG. 5 may be shown as an example of an image 520. Thus, the function parameters of the lane model for each of the lanes may be calculated by using the pixel information given as described above. That is, the lanes may be represented by defining a function that best describes the center points on the lanes $L_{i,j}$.

Herein, the lane modeling function may be a parameterized function, and the function parameters may be acquired by using a regression algorithm. Various algorithms may be used for the regression algorithm, according to the lane modeling function.

Further, the lane modeling function may be a polynomial function, and the regression algorithm may be a least square error algorithm.

At the step of S03, the function parameters may be classified into K cluster groups by using the clustering algorithm, and the cluster ID GT vector representing the cluster IDs corresponding to the types of the lanes in each image of the at least one image data set may be generated. In this process, the cluster IDs of the lanes for creating training data may be defined. In the process, more specifically, the function parameters may be classified into the K cluster groups by using the clustering algorithm, each of the cluster IDs may be assigned to each of the cluster groups, and the cluster ID GT vector representing GT information on exact probabilities of being the cluster IDs corresponding to the types of the lanes may be generated.

That is, every each of the function parameters of the lane modeling function from every image may be classified into the K cluster groups by using the clustering algorithm, and the learning device may learn the device parameters of the CNN to estimate which of the cluster IDs the lanes in the input image belong to.

Clustering is a method to classify N data into K clusters or groups where N≥K. Typical clustering includes k-means clustering, spectral clustering, etc. and any clustering methods may be used in the present invention. Further, clustering is the task of grouping a set of objects in such a way that objects in the same group, i.e., cluster, are more similar to each other than to those in other groups.

N parameters $\theta_{i,j}$ of the lanes in said each image of the at least one image data set included in the training data are classified into K clusters, where each of the lanes $L_{i,j}$ is included in only one cluster $C_k$ and where 1≤k≤K. That is, no two clusters share a lane as their element. Herein, the cluster ID of the lane $L_{i,j}$ may be k.

Each cluster has its representative value $\theta_k$ which is an averaged value $$\theta_k = \frac{1}{|C_k|} \sum_{L_{i,j} \in C_k} \theta_{i,j}$$

over the function parameters of its lanes. Thus, if the cluster IDs of the lanes in the input image is known, the lanes may be represented approximately as the representative value of the cluster.

By referring to an image 530 of FIG. 5, solid lines may be the lanes drawn by using the function parameters of the GT lanes, and dotted lines may be exemplar lanes drawn by using the representative cluster group values of the clusters to which their corresponding function parameters of the GT lanes belong as shown in FIG. 5. As shown in the image 530 of FIG. 5, each of the representative cluster group values of the cluster does not represent a perfect GT lane, but does represent a lane very similar to the GT lane.

Learning of the function parameters or the device parameters for the lane detection may be performed based on these processes, although directly estimating the function parameters from the input image using features in the feature maps is not easy. Therefore, it is an object of the present invention to estimate the cluster IDs of the lanes in the input image. Knowing the cluster IDs may help finding the lane modeling function having the corresponding function parameters, and thus may further help finding the lanes more accurately.

Figure 6:
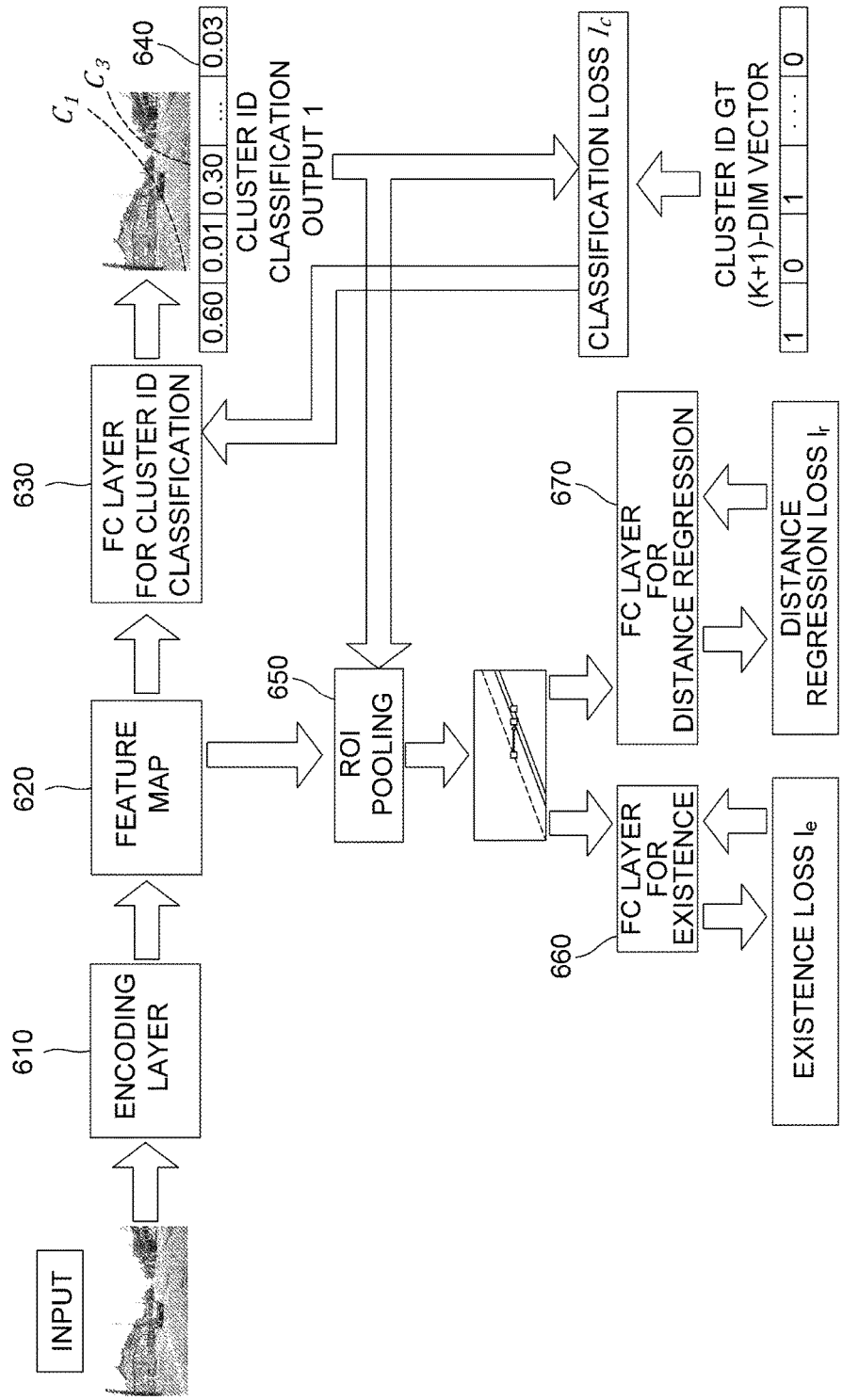
FIG. 6 is a drawing schematically illustrating the learning method of the CNN capable of detecting the lane in accordance with the present invention.

FIG. 6 is a drawing schematically illustrating the learning method of the CNN for detecting the lanes through the lane model in accordance with the present invention.

By referring to FIGS. 4 and 6, at the step of S04, for the purpose of learning the device parameters of the CNN capable of estimating at least one of the cluster IDs corresponding to at least one of the lanes in the input image acquired from the at least one image data set, an encoding layer 610 may be used to instruct one or more convolutional layers to generate the feature maps 620 by applying one or more convolution operations to the input image.

At the step of S05, as illustrated in FIG. 6, the result vector of the cluster ID classifications may be acquired from the feature maps, and the classification loss may be calculated by referring to the result vector of the cluster ID classifications and the cluster ID GT vector. That is, the learning device may instruct an FC layer 630 to generate the result vector of the cluster ID classifications of the lanes in the input image by feeding a feature map 620 outputted from the convolutional layers into the FC layer 630 and, may calculate the classification loss by referring to the result vector 640 and the cluster ID GT vector. Herein, the classification loss may be used to optimize the device parameters of the CNN by backpropagation.

Meanwhile, the cluster ID GT vector may be a K+1 dimensional vector including the cluster IDs of the lanes in said each image of the at least one image data set, and (i) on condition that the lanes are determined as present in the input image, if there is a lane having a specific cluster ID Ck among the K cluster IDs in the input image, then a k-th dimension of the cluster ID GT vector may be filled with 1, other dimensions of the cluster ID GT vector which correspond to other cluster IDs corresponding to clusters not in the input image may be filled with 0, and a (K+1)-th dimension of the cluster ID GT vector may be filled with 0, and (ii) if no lanes are determined as present in the input image, a first dimension to a K-th dimension of the cluster ID GT vector may be filled with 0, and the (K+1)-th dimension of the cluster ID GT vector may be filled with 1.

For example, among K+1 dimensions in the cluster ID GT vector corresponding to the image 530 of FIG. 5, its i-th, j-th, and k-th dimensions may be filled with 1, and the rest of its dimensions including the (k+1)-th dimension may be filled with 0. If no lanes are determined as present in the input image, the cluster ID GT vector may be in a form of (0, 0, . . . , 0, 1).

Figure 7:
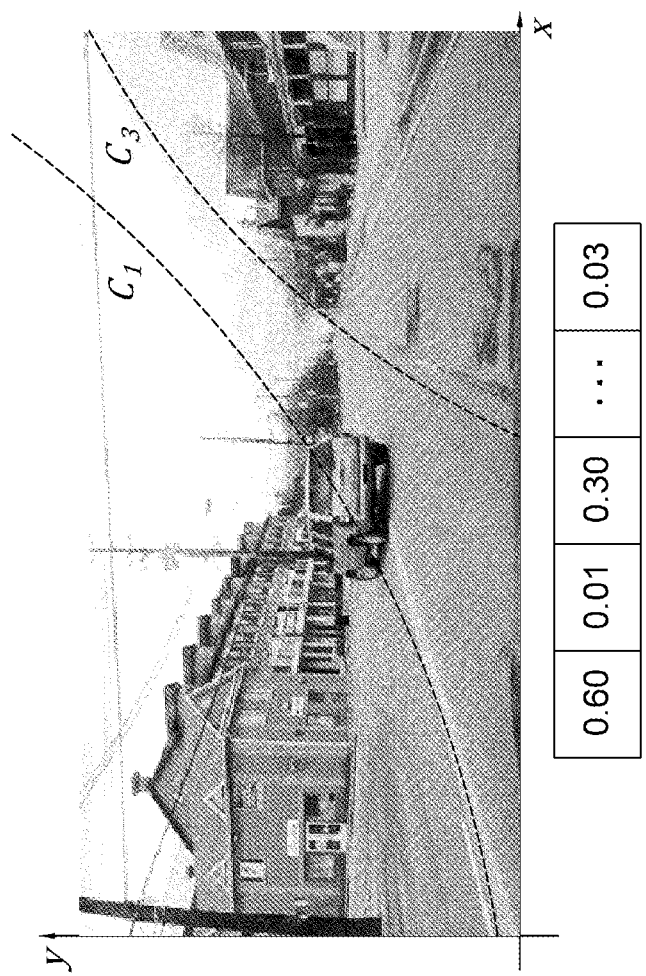
FIG. 7 is a drawing schematically illustrating an example of a result vector of cluster ID classifications of the lanes detected by a learning device in accordance with the present invention.

FIG. 7 is a drawing schematically illustrating an example of the result vector of the cluster ID classifications of the lanes detected by the learning device in accordance with the present invention.

By referring to FIGS. 6 and 7, the feature map 620 may be inputted into the FC layer 630 and its result vector 640 may be outputted, and the result vector may be a K+1 dimensional vector corresponding to the cluster ID GT vector which may also be a K+1 dimensional vector. In the example of FIG. 7, the calculated result vector 640 may be expressed as (0.60, 0.01, 0.30, . . . , 0.03). That is, in the example of FIG. 7, it may be determined that the lanes whose cluster IDs are C1 and C3 have high probabilities of being in the input image. If the cluster ID GT vector of the input image is confirmed as having the cluster IDs of C1 and C3, that is, if the cluster ID GT vector is (1, 0, 1, 0, . . . , 0), then the classification loss may be calculated by referring to the calculated result vector (0.60, 0.01, 0.30, . . . , 0.03) and the cluster ID GT vector (1, 0, 1, 0, . . . , 0). This classification loss lc may also be calculated as a cross entropy loss between the result vector and the cluster ID GT vector.

At the step of S06, a representative cluster group value corresponding to the estimated cluster ID may be acquired, and the representative cluster group value θk as the estimated lanes may be acquired. As described at the step of S03, because each of the cluster groups has the averaged value $$\theta_k = \frac{1}{|C_k|} \sum_{L_{i,j} \in C_k} \theta_{i,j}$$

over the function parameters of its lanes as its representative cluster group value $\theta_k$, the learning device may acquire or support another device to acquire the representative cluster group value $\theta_k$ corresponding to the cluster ID estimated at the step of S05, and may determine or support another device to determine each of the estimated lanes represented by each of the representative cluster group values $\theta_k$.

In this case, each of the representative cluster group values may be acquired by using at least part of the estimated cluster IDs, where the at least part of the estimated cluster IDs are selected by referring to information on whether each of vector components of the result vector is larger than a predetermined threshold. Then, the estimated lanes may be acquired using the lane model representing the types of the lanes, by calculating $x=f(y|\theta_k)$ from $\theta_k$ which is an acquired representative parameter of the cluster $C_k$.

Then, by referring to FIG. 6 again, after the above processes, a process of learning differences between the coordinates of the center points of the estimated lanes and those of the GT lanes may be performed. The learning device, for each proposed cluster which is a cluster having a value larger than the predetermined threshold among the result vector of the cluster ID classifications, may generate or support another device to generate the existence loss and the distance regression loss, i.e., two outputs, for each y value.

First of all, at the step of S07, the existence loss may be calculated which represents whether one of the GT lanes is present near the estimated lanes, and as illustrated in FIG. 6, the feature map 620 and the result vector 640 may be inputted into an ROI (Region Of Interest) pooling layer 650, and a result from the ROI pooling layer 650 is inputted into an FC layer 660 for detecting presence of the lanes, then the existence loss le may be calculated.

Figure 8:
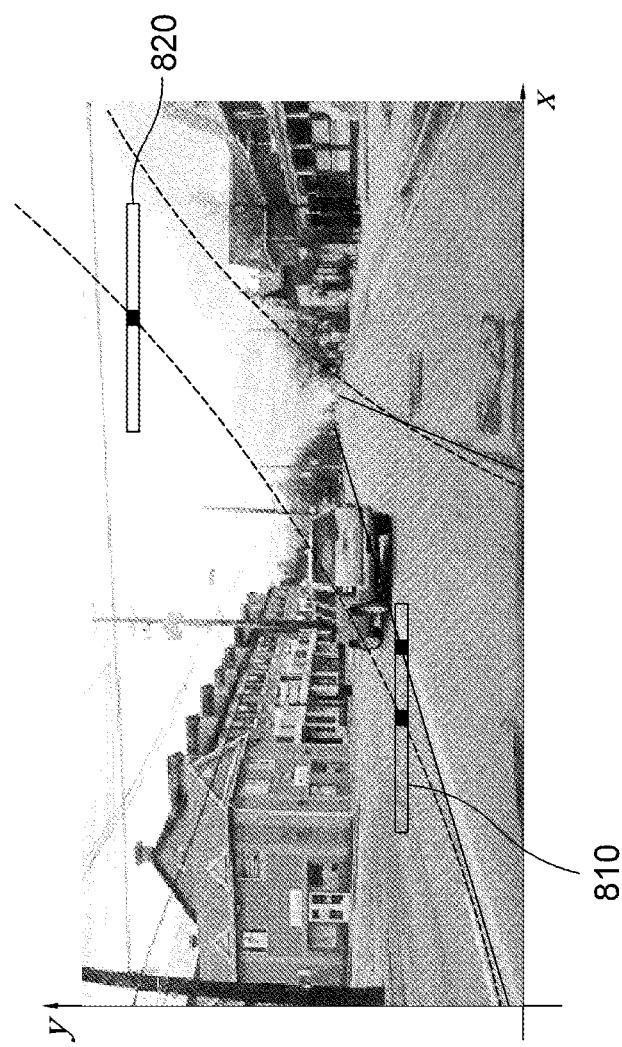
FIG. 8 is a drawing schematically illustrating a process of confirming whether coordinates of a GT lane exist in either direction parallel to an x-axis from coordinates of an estimated lane in accordance with the present invention.

FIG. 8 is a drawing schematically illustrating a process of confirming whether the coordinates of the GT lanes exist in either direction parallel to the x-axis from the coordinates of the estimated lanes, and by referring to FIG. 8, the dotted lines may represent the estimated lanes acquired by using the estimated cluster IDs. The learning device may calculate or support another device to calculate values representing whether the coordinates of the GT lanes are present near each pixel on the dotted lines with respect to y value of said each pixel, for example, the learning device may generate or support another device to generate the existence loss which represents whether one of the GT lanes is present near each of the estimated lanes, based on whether coordinates of said one of the GT lanes are present within a certain number of pixels in either direction parallel to the x-axis from the respective coordinates of each of the estimated lanes. The existence loss may be a label representing whether said one of the GT lanes is near, and may be a two dimensional vector. For example, [1, 0] if one of the GT lanes is near the estimated lanes, and [0, 1] if no GT lanes are near the estimated lanes.

In this case, as described earlier, a method may be used for determining whether the center points of one of the GT lanes are present within a nearby area within a certain number of pixels in either direction parallel to the x-axis from the respective coordinates acquired by calculating $f(y|\theta_k)$ for each y value of the estimated lanes. Herein, the nearby area may be expressed as $R=\{(x, y)|y \text{ are fixed}, |x-f(y|\theta_k)|<d\}$, and the center points of said one of the GT lanes may be expressed as $(x^{GT}, y)$.

By referring to FIGS. 4 and 6 again, at the step of S08, if one of the GT lanes are determined as present near the estimated lanes, the distance regression loss may be calculated by referring to each of distances between pixels of the estimated lanes and their corresponding pixels of the GT lanes, and as illustrated in FIG. 6, the feature map 620 and the result vector 640 of the cluster ID classifications may be inputted into the ROI pooling layer 650, and the result from the ROI pooling layer 650 may be inputted into an FC layer 670 for detecting differences between the GT lanes and the estimated lanes, then if the GT lanes are determined as present near the estimated lanes, the distance regression loss lr may be calculated.

Figure 10:
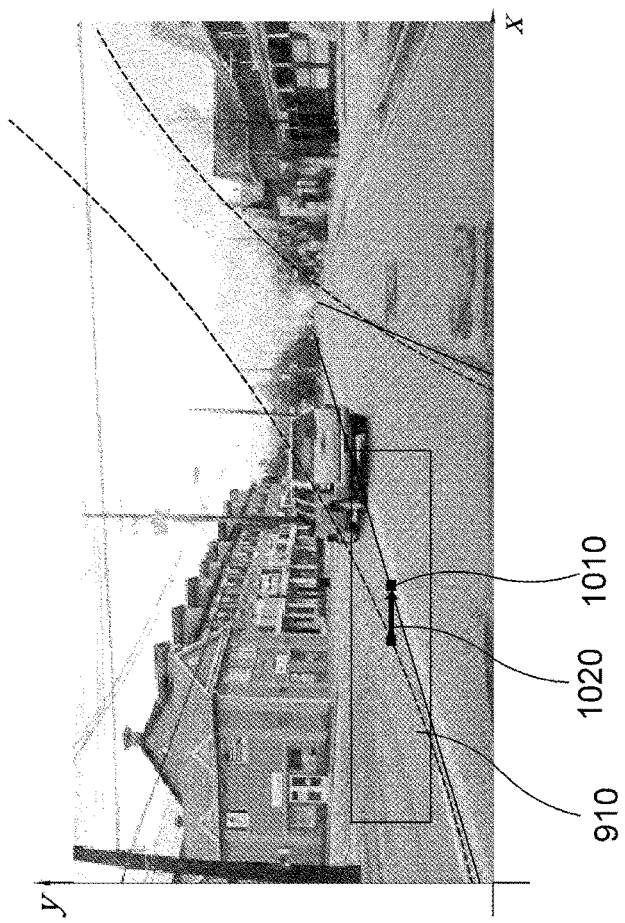
FIG. 10 is a drawing schematically illustrating a process of calculating at least one distance regression loss which is acquired by referring to a distance between a pixel of the estimated lane and a pixel of a GT lane.

FIG. 10 illustrates a process of calculating the distance regression loss, and as illustrated in example thereof, if said one of the GT lanes is determined as present near each of the estimated lanes, the distance regression loss lr may be calculated by referring to each of distances $x^{GT}-f(y|\theta_k)$ 1020 between each of pixels $(f(y|\theta_k),y)$ of each of the estimated lanes and each of pixels $(x^{GT}, y)$ 1010 of each corresponding one of the GT lanes.

In the example of FIG. 8, if a certain region, like the region 810 represented as the solid lines, is searched in the either direction parallel to the x-axis from the pixels of the estimated lanes, and if one of the GT lanes is determined as present, like the pixels on the solid line in the positive direction of the x-axis from the coordinates of the pixels on the estimated lanes, then a first output, i.e., the existence loss, may be [1, 0], and a second output, i.e., the distance regression loss, may be acquired by referring to a difference between the x-coordinates of the two pixels. However, if a certain region, like the region 820 represented as the solid lines, is searched in the either direction parallel to the x-axis from the pixels of the estimated lanes, and if no GT lanes are determined as present near the pixels on each of the estimated lanes, then the first output, i.e., the existence loss, may be [0, 1], and the second output, i.e., the distance regression loss may be generated as "don't care" type. The output of the "don't care" type is not used for learning.

Figure 9:
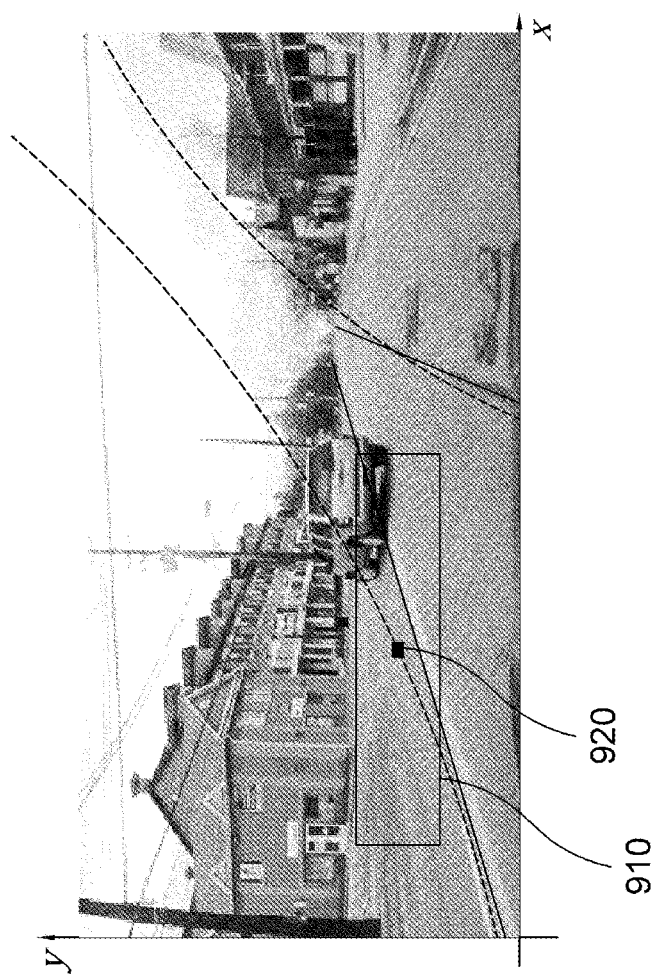
FIG. 9 is a drawing schematically illustrating extraction of features near a certain pixel in the estimated lane from a feature map in accordance with the present invention.

Meanwhile, as in FIG. 9 illustrating extraction of areal features near the pixels of the estimated lanes from the feature map, the ROI pooling layer 650 may extract the areal features of region 910 near the pixels 920 $(f(y|\theta_k),y)$ on the estimated lanes from the feature map. The learning device may calculate or support another device to calculate the existence loss and the distance regression loss by using the feature map outputted from the ROI pooling layer 650. Herein, the learning device may further perform or support another device to perform processes of extracting the areal features of the region 910 near the pixels 920 on the estimated lanes from the feature map, and of calculating the existence loss and the distance regression loss based on the areal features.

That is, the present invention provides a method of performing calculation, not by checking every pixel in the feature map of the input image, but by extracting only nearby areas of the pixels on the estimated lanes as illustrated in FIG. 9, and thus remarkably reducing the amount of calculation.

Then, the step of S09 may be performed by backpropagating the classification loss, the existence loss and the distance regression loss, to thereby optimize the device parameters of the CNN.

Meanwhile, the existence loss is used for determining whether the lanes are present nearby or not, therefore it may be regarded as classification. Thus, the existence loss may calculated by using the cross entropy, etc. Further, the distance regression loss uses a distance between coordinates acquired from learning and the GT coordinates, therefore it may be regarded as a regression loss. As a result, the distance regression loss may be calculated by using the Euclidean distance loss, etc.

The device parameters of the learning device are optimized by learning processes described in FIGS. 4 to 10, and the lanes within images inputted from real-world driving situation are detected by using a testing device employing the device parameters.

Figure 11:
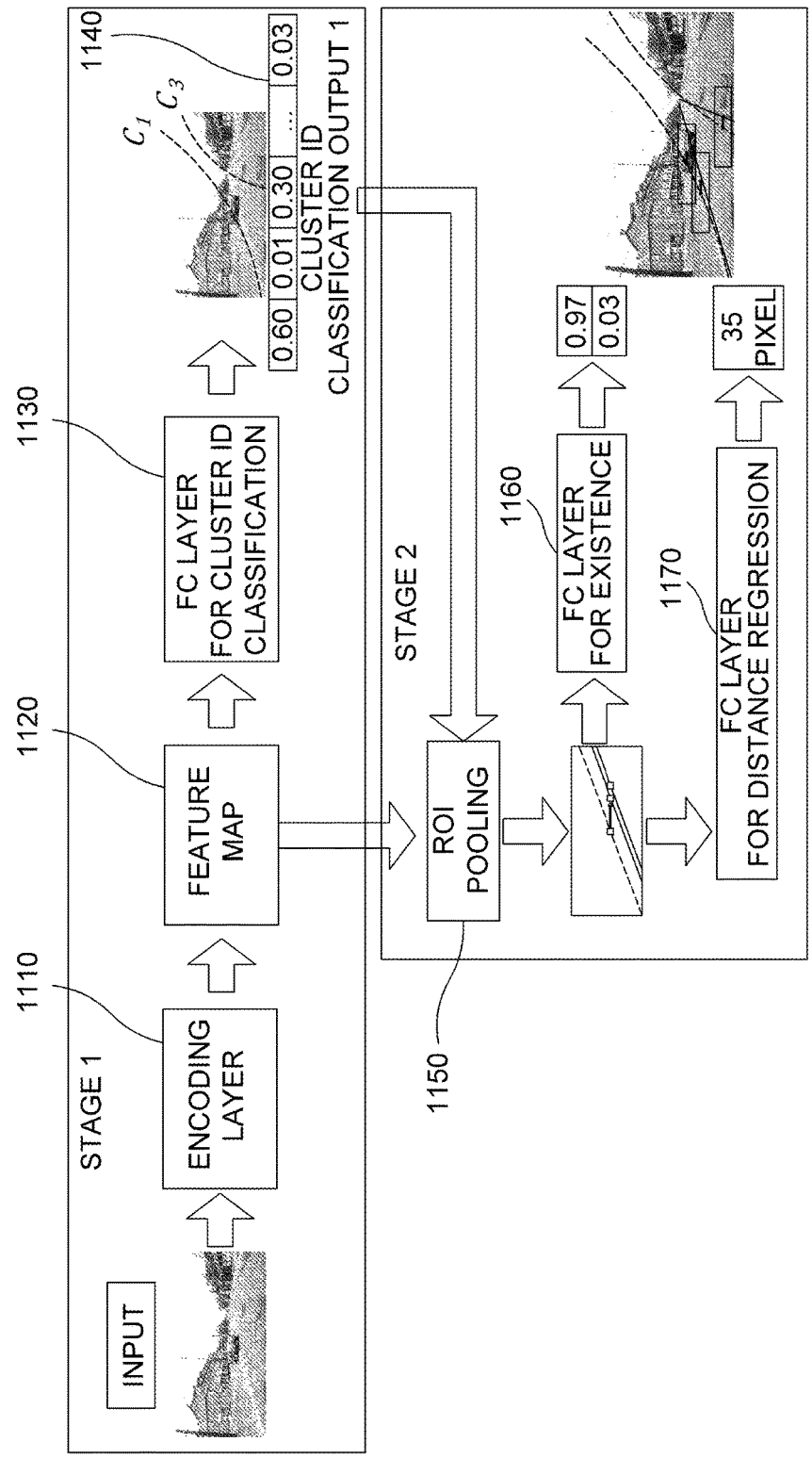
FIG. 11 is a drawing schematically illustrating a process of lane detection through the lane model by using a testing device in accordance with the present invention.

FIG. 11 is a drawing schematically illustrating a process of the lane detection through the lane model by using the testing device in accordance with the present invention.

By referring to FIG. 11, if an input image for testing is acquired, the testing device using the device parameters may instruct its encoding layer 1110 to apply the convolution operations to the acquired input image for testing, to thereby generate a feature map for testing 1120, and may input the feature map for testing 1120 into an FC layer 1130 for cluster ID classification, to thereby generate a result vector of the cluster ID classifications for testing 1140, which represents estimated cluster IDs for testing of cluster groups of the lanes in the input image for testing.

Then, the testing device may generate or support another device to generate each of representative cluster group values for testing by using at least part of the estimated cluster IDs for testing, where the at least part of the estimated cluster IDs for testing are determined by referring to information on whether each of vector components of the result vector of the cluster ID classifications for testing 1140 is larger than the predetermined threshold, and may determine each of estimated lanes for testing represented by each of the representative cluster group value $\theta_k$ for testing. Herein, on condition that each of the lanes $L_{i,j}$ is included in its corresponding group $C_k$ of the cluster groups, where k ranges from 1 to K, and that k is each cluster ID among the cluster IDs corresponding to said each of the lanes $L_{i,j}$, each of the cluster groups has each of averaged values $$\theta_k = \frac{1}{|C_k|} \sum_{L_{i,j} \in C_k} \theta_{i,j}$$

over the function parameters of the respective lanes included in the respective cluster groups, as each of representative cluster group values $\theta_k$.

Then, the testing device may perform following processes by using the lanes represented by the representative cluster group values. That is, the testing device may perform or support another device to perform processes of (i) acquiring each x value for each y value from the representative cluster group values by using the equation $\{(x, y)|x=f(y|\theta_{i,j})\}$, (ii) extracting areal features of the pixels on the estimated lanes for testing by using an ROI pooling layer 1150, (iii) determining whether actual lanes are present by using outputs from an FC layer 1160, (iv) if the actual lanes are determined as present, calculating each of distances between the actual lanes and the lanes represented by the representative cluster group values by using the FC layer for distance regression 1170, and (v) determining lanes, acquired via using the representative cluster group values and translating pixels of the estimated lanes by the amount of said each of distances, as the actual lanes. That is, the testing device may perform or support another device to perform a step of extracting the areal features of certain regions near the pixels of the estimated lanes for testing from the feature map; a step of determining whether one of the actual lanes is present near each of the estimated lanes for testing, based on whether coordinates of said one of the actual lanes are present within a certain number of pixels in either direction parallel to the x-axis from respective coordinates of said each of the estimated lanes for testing, and if said one of the actual lanes is present nearby, calculating a distance between coordinates of said one of the actual lanes and those of the estimated lanes for testing; and a step of determining the estimated lanes for testing via translating the estimated lanes for testing by the amount of the distance. Herein, the actual lanes at the step of testing do not necessarily mean the GT lanes, but lanes in the input image for testing. The presence of the lanes within the ROI may be determined by the process (iii) of existence classification, and the difference between the actual lanes and the lanes estimated from the representative cluster group values may be estimated by using features in the ROI at the process (iv) of distance regression, thus the estimated lanes for testing may be determined by referring to the difference of the distances.

Thus, the present invention discloses methods of generating data for learning the lane model by clustering and modeling of the lanes from the data for learning, learning the function parameters of the lane modeling function of the lanes in the input image based on the data for learning, and deriving the lane modeling function from the input image and detecting the lanes based on the lane modeling function. Further, the lanes may be detected with less computations than conventional technology because only the feature maps near the detected lanes are used.

As can be understood by those skilled in the art, it is clear that communication parts of the learning device and the testing device may perform transmission of image data, for example, images described above like a training image, an input image, and an input image for testing, etc., that processors and/or memories of the learning device and the testing device may retain data for feature maps and performing operations, and that the processors of the learning device and the testing device may perform convolution operations, deconvolution operations, and loss value operations, but the scope of the present invention is not limited thereto.

The present invention has an effect of generating data for learning the lane model by clustering and modeling of the lanes from the data for learning, and learning the function parameters by referring to the cluster IDs of the lane modeling function of the lanes in the input image based on the data for learning.

The present invention has another effect of detecting the lanes based on the lane modeling functions derived from the input image by CNN learning.

The present invention has still another effect of detecting the lanes with less computations than conventional technology because only feature maps near the detected lanes are used.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a compiler but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A learning method for detecting one or more lanes by using a CNN, comprising steps of:
   (a) a learning device instructing one or more convolutional layers to generate one or more feature maps by applying one or more convolution operations to an input image selected from at least one image data set;
   (b) the learning device instructing an FC layer to generate an estimated result vector of cluster ID classifications of the lanes in the input image by feeding a specific feature map among the feature maps outputted from the convolutional layers into the FC layer; and
   (c) the learning device instructing a loss layer to generate at least one classification loss by referring to the estimated result vector of the cluster ID classifications and a cluster ID GT vector, and backpropagate the classification loss, to thereby optimize device parameters of the CNN;
   wherein the cluster ID GT vector is GT information on probabilities of being cluster IDs per each of cluster groups assigned to function parameters of a lane modeling function by clustering the function parameters acquired based on information on the lanes in the input image.

2. The method of claim 1, wherein the cluster ID GT vector is a K+1 dimensional vector, and (i) on condition that the lanes are determined as present in the input image, if there is a specific lane, having a specific cluster ID $C_k$ among the K cluster IDs, among the lanes in the input image, then a k-th dimension of the cluster ID GT vector is filled with 1, other dimensions of the cluster ID GT vector which respectively correspond to other cluster IDs, among the cluster IDs, not in the input image are filled with 0, and a (K+1)-th dimension of the cluster ID GT vector is filled with 0, and (ii) if no lanes are determined as present in the input image, a first dimension to a K-th dimension of the cluster ID GT vector are filled with 0, and the (K+1)-th dimension of the cluster ID GT vector is filled with 1,
   wherein k is an integer ranging from 1 to K, and
   wherein, at the step of (c), the estimated result vector of the cluster ID classifications is a K+1 dimensional vector.

3. The method of claim 2, wherein, on condition that each of the lanes $L_{i,j}$ is included in its corresponding cluster group $C_k$ of the cluster groups, and that k is each cluster ID among the cluster IDs corresponding to said each of the lanes $L_{i,j}$, each of the cluster groups has each of averaged values $$\theta_k = \frac{1}{|C_k|} \sum_{L_{i,j} \in C_k} \theta_{i,j}$$

over the function parameters of the respective lanes included in the respective cluster groups, as each of representative cluster group values $\theta_k$, and
   wherein the method further comprises a step of:
   (d) the learning device generating or supporting another device to generate each of the representative cluster group values corresponding to each of the estimated cluster IDs, and determining or supporting another device to determine each of the estimated lanes represented by each of the representative cluster group values $\theta_k$.

4. The method of claim 3, wherein, each of the representative cluster group values is acquired by using at least part of the estimated cluster IDs, wherein the at least part of the estimated cluster IDs are determined by referring to information on whether each of vector components of the result vector is larger than a predetermined value.

5. The method of claim 3, further comprising steps of:
   (e) the learning device generating or supporting another device to generate at least one existence loss which represents whether one of GT lanes is present near each of the estimated lanes, based on whether coordinates of said one of the GT lanes is present within a certain number of pixels in either direction parallel to an x-axis from respective coordinates of each of the estimated lanes;
   (f) the learning device, if said one of the GT lanes is determined as present near each of the estimated lanes, generating or supporting another device to generate at least one distance regression loss by referring to each of distances $x^{GT} - f(y|\theta_k)$ between each of pixels $(f(y|\theta_k),y)$ of each of the estimated lanes and each of pixels $(x^{GT}, y)$ of each corresponding one among the GT lanes; and
   (g) the learning device backpropagating or supporting another device to backpropagate the existence loss and the distance regression loss, to thereby optimize the device parameters of the CNN.

6. The method of claim 5, before the step of (e), further comprising a step of:
   (e0) the learning device extracting or supporting another device to extract each of one or more areal features which represents each of areas near the pixels $(f(y|\theta_k), y)$ of each of the estimated lanes from the specific feature map;
   wherein the existence loss and the distance regression loss are generated based on the areal features.

7. The method of claim 5, wherein, at the step of (e), the existence loss is generated by using a cross entropy, and wherein, at the step of (f), the distance regression loss is generated by using at least one Euclidean distance regression loss.

8. A testing method of a CNN capable of detecting one or more lanes using a lane model, comprising steps of:
   (a) on condition that a learning device has (i) instructed one or more convolutional layers to generate one or more feature maps for training by applying one or more convolution operations to an input image for training selected from at least one image data set for training; (ii) instructed an FC layer to generate an estimated result vector of cluster ID classifications for training of the lanes in the input image for training by feeding a specific feature map for training among the feature maps for training outputted from the convolutional layers into the FC layer, and instructed a loss layer to generate at least one classification loss by referring to the estimated result vector of the cluster ID classifications for training and a cluster ID GT vector; (iii) generated each of representative cluster group values for training corresponding to each of estimated cluster IDs for training, and determined each of estimated lanes for training represented by each of the representative cluster group values $\theta_k$ for training; (iv) generated at least one existence loss which represents whether one of GT lanes is present near each of the estimated lanes for training, based on whether coordinates of said one of the GT lanes is present within a certain number of pixels in either direction parallel to an x-axis from respective coordinates of each of the estimated lanes for training; (v) generated at least one distance regression loss by referring to each of distances $x^{GT} - f(y|\theta_k)$ between each of pixels $(f(y|\theta_k), y)$ of each of the estimated lanes for training and each of pixels $(x^{GT}, y)$ of each corresponding one, determined as present near each of the estimated lanes for training, among the GT lanes; and (vi) backpropagated the classification loss, the existence loss and the distance regression loss, to thereby optimize the device parameters of the CNN, a testing device acquiring or supporting another device to acquire a test image;

(b) the testing device generating or supporting another device to generate one or more feature maps for testing by applying the convolution operations to the test image;

(c) the testing device instructing the FC layer to generate a result vector of cluster ID classifications for testing of the lanes in the test image by feeding a specific feature map for testing among the feature maps for testing into the FC layer wherein the result vector of cluster ID classifications for testing includes each of one or more cluster IDs for testing estimated for each of the lanes; and (d) the testing device generating each of representative cluster group values for testing corresponding to each of the estimated cluster IDs for testing, and determining each of estimated lanes for testing represented by each of the representative cluster group values $\theta_k$ for testing;

wherein the cluster ID GT vector is GT information on probabilities of being the cluster IDs for training per each of cluster groups assigned to function parameters of a lane modeling function by clustering the function parameters acquired based on information on the lanes in the input image for training, and wherein, if each of the lanes $L_{i,j}$ is included in its corresponding group $C_k$ of the cluster groups, k ranging from 1 to K, and if k is each cluster ID among the cluster IDs for training corresponding to said each of the lanes $L_{i,j}$, each of the cluster groups has each of averaged values $$\theta_k = \frac{1}{|C_k|} \sum_{L_{i,j} \in C_k} \theta_{i,j}$$

over the function parameters of the respective lanes included in the respective cluster groups, as each of representative cluster group values $\theta_k$ for training.

9. The method of claim 8, further comprising steps of:

(e) the testing device extracting or supporting another device to extract each of one or more areal features which represents each of areas near the pixels $(f(y|\theta_k), y)$ of each of the estimated lanes for testing from the specific feature map for testing;

(f) the testing device determining or supporting another device to determine whether one of actual lanes is present near each of the estimated lanes for testing, based on whether coordinates of said one of the actual lanes are present within a certain number of pixels in either direction parallel to the x-axis from respective coordinates of said each of the estimated lanes for testing, and if said one of the actual lanes is determined as present nearby, calculating or supporting another device to calculate each of distances between coordinates of said one of the actual lanes and those of the estimated lanes for testing; and (g) the testing device determining or supporting another device to determine the estimated lanes for testing via translating the estimated lanes for testing by the amount of said each of the distances.

10. The method of claim 8, wherein, at the step of (d), each of the representative cluster group values for testing is acquired by using at least part of the estimated cluster IDs for testing, wherein the at least part of the estimated cluster IDs for testing are determined by referring to information on whether each of vector components of the result vector of the cluster ID classifications for testing is larger than a predetermined value.

11. A learning device for detecting one or more lanes by using a CNN, comprising:

a processor for performing processes of (i) instructing one or more convolutional layers to generate one or more feature maps by applying one or more convolution operations to an input image; (ii) instructing an FC layer to generate an estimated result vector of cluster ID classifications of the lanes in the input image by feeding a specific feature map among the feature maps outputted from the convolutional layers into the FC layer; and (iii) instructing a loss layer to generate at least one classification loss by referring to the estimated result vector of the cluster ID classifications and a cluster ID GT vector, and backpropagate the classification loss, to thereby optimize device parameters of the CNN; wherein the cluster ID GT vector is GT information on probabilities of being cluster IDs per each of cluster groups assigned to function parameters of a lane modeling function by clustering the function parameters acquired based on information on the lanes in the input image.

12. The learning device of claim 11, wherein the cluster ID GT vector is a K+1 dimensional vector, and (I) on condition that the lanes are determined as present in the input image, if there is a specific lane, having a specific cluster ID $C_k$ among the K cluster IDs, among the lanes in the input image, then a k-th dimension of the cluster ID GT vector is filled with 1, other dimensions of the cluster ID GT vector which respectively correspond to other cluster IDs, among the cluster IDs, not in the input image are filled with 0, and a (K+1)-th dimension of the cluster ID GT vector is filled with 0, and (II) if no lanes are determined as present in the input image, a first dimension to a K-th dimension of the cluster ID GT vector are filled with 0, and the (K+1)-th dimension of the cluster ID GT vector is filled with 1, wherein k is an integer ranging from 1 to K, and wherein, at the process of (iii), the estimated result vector of the cluster ID classifications is a K+1 dimensional vector.

13. The learning device of claim 12, wherein, on condition that each of the lanes $L_{i,j}$ is included in its corresponding cluster group $C_k$ of the cluster groups, and that k is each cluster ID among the cluster IDs corresponding to said each of the lanes $L_{i,j}$, each of the cluster groups has each of averaged values $$\theta_k = \frac{1}{|C_k|} \sum_{L_{i,j} \in C_k} \theta_{i,j}$$

over the function parameters of the respective lanes included in the respective cluster groups, as each of representative cluster group values $\theta_k$, and wherein the processor further performs a process of:
(iv) generating or supporting another device to generate each of the representative cluster group values corresponding to each of the estimated cluster IDs, and determining or supporting another device to determine each of the estimated lanes represented by each of the representative cluster group values $\theta_k$.

14. The learning device of claim 13, wherein, each of the representative cluster group values is acquired by using at least part of the estimated cluster IDs, wherein the at least part of the estimated cluster IDs are determined by referring to information on whether each of vector components of the result vector is larger than a predetermined value.

15. The learning device of claim 13, wherein the processor further performs processes of:
(v) generating or supporting another device to generate at least one existence loss which represents whether one of GT lanes is present near each of the estimated lanes, based on whether coordinates of said one of the GT lanes is present within a certain number of pixels in either direction parallel to an x-axis from respective coordinates of each of the estimated lanes;
(vi) if said one of the GT lanes is determined as present near each of the estimated lanes, generating or supporting another device to generate at least one distance regression loss by referring to each of distances $x^{GT} - f(y|\theta_k)$ between each of pixels $(f(y|\theta_k),y)$ of each of the estimated lanes and each of pixels $(x^{GT}, y)$ of each corresponding one among the GT lanes; and
(vii) backpropagating or supporting another device to backpropagate the existence loss and the distance regression loss, to thereby optimize the device parameters of the CNN.

16. The learning device of claim 15, wherein, before the process of (v), the processor further performs a process of:
(v0) extracting or supporting another device to extract each of one or more areal features which represents each of areas near the pixels $(f(y|\theta_k),y)$ of each of the estimated lanes from the specific feature map;
wherein the existence loss and the distance regression loss are generated based on the areal features.

17. The learning device of claim 15, wherein, at the process of (v), the existence loss is generated by using a cross entropy, and wherein, at the process of (vi), the distance regression loss is generated by using at least one Euclidean distance regression loss.

18. A testing device of a CNN capable of detecting one or more lanes using a lane model, comprising:

a processor configured to
(I) process a test image after a learning device has (i) instructed one or more convolutional layers to generate one or more feature maps for training by applying one or more convolution operations to an input image for training selected from at least one image data set for training; (ii) instructed an FC layer to generate an estimated result vector of cluster ID classifications for training of the lanes in the input image for training by feeding a specific feature map for training among the feature maps for training outputted from the convolutional layers into the FC layer, and instructed a loss layer to generate at least one classification loss by referring to the estimated result vector of the cluster ID classifications for training and a cluster ID GT vector; (iii) generated each of representative cluster group values for training corresponding to each of estimated cluster IDs for training, and determined each of estimated lanes for training represented by each of the representative cluster group values $\theta_k$ for training; (iv) generated at least one existence loss which represents whether one of GT lanes is present near each of the estimated lanes for training, based on whether coordinates of said one of the GT lanes is present within a certain number of pixels in either direction parallel to an x-axis from respective coordinates of each of the estimated lanes for training; (v) generated at least one distance regression loss by referring to each of distances $x^{GT} - f(y|\theta_k)$ between each of pixels $(f(y|\theta_k),y)$ of each of the estimated lanes for training and each of pixels $(x^{GT}, y)$ of each corresponding one, determined as present near each of the estimated lanes for training, among the GT lanes; and (vi) backpropagated the classification loss, the existence loss and the distance regression loss, to thereby optimize the device parameters of the CNN;
(II) generate or support another device to generate one or more feature maps for testing by applying the convolution operations to the test image;
(III) instruct the FC layer to generate a result vector of cluster ID classifications for testing of the lanes in the test image by feeding a specific feature map for testing among the feature maps for testing into the FC layer wherein the result vector of cluster ID classifications for testing includes each of one or more cluster IDs for testing estimated for each of the lanes; and
(IV) generate each of representative cluster group values for testing corresponding to each of the estimated cluster IDs for testing, and determining each of estimated lanes for testing represented by each of the representative cluster group values $\theta_k$ for testing;
wherein the cluster ID GT vector is GT information on probabilities of being the cluster IDs for training per each of cluster groups assigned to function parameters of a lane modeling function by clustering the function parameters acquired based on information on the lanes in the input image for training, and
wherein, if each of the lanes Li,j is included in its corresponding group Ck of the cluster groups, k ranging from 1 to K, and if k is each cluster ID among the cluster IDs for training corresponding to said each of the lanes Li,j, each of the cluster groups has each of averaged values $$\theta_k = \frac{1}{|C_k|} \sum_{L_{i,j} \in C_k} \theta_{i,j}$$

over the function parameters of the respective lanes included in the respective cluster groups, as each of representative cluster group values $\theta_k$ for training.

19. The testing device of claim 18, wherein the processor further performs processes of:

(V) extracting or supporting another device to extract each of one or more areal features which represents each of areas near the pixels $(f(y|\theta_k),y)$ of each of the estimated lanes for testing from the specific feature map for testing;

(VI) determining or supporting another device to determine whether one of actual lanes is present near each of the estimated lanes for testing, based on whether coordinates of said one of the actual lanes are present within a certain number of pixels in either direction parallel to the x-axis from respective coordinates of said each of the estimated lanes for testing, and if said one of the actual lanes is determined as present nearby, calculating or supporting another device to calculate each of distances between coordinates of said one of the actual lanes and those of the estimated lanes for testing; and (VII) determining or supporting another device to determine the estimated lanes for testing via translating the estimated lanes for testing by the amount of said each of the distances.

20. The testing device of claim 18, wherein, at the process of (IV), each of the representative cluster group values for testing is acquired by using at least part of the estimated cluster IDs for testing, wherein the at least part of the estimated cluster IDs for testing are determined by referring to information on whether each of vector components of the result vector of the cluster ID classifications for testing is larger than a predetermined value.

* * * * *